United States Patent [19]
Proctor et al.

[11] 4,118,597
[45] Oct. 3, 1978

[54] METHOD AND APPARATUS FOR DETECTING DIRECT CURRENTS IN A TRANSMISSION LINE

[75] Inventors: Darryl F. Proctor, Redmond; Peter T. Skelly, Issaquah; Darrell D. Cole, Seattle, all of Wash.

[73] Assignee: Proctor & Associates Company, Redmond, Wash.

[21] Appl. No.: 589,191

[22] Filed: Jun. 23, 1975

[51] Int. Cl.$^2$ .................. H04M 3/22; H02H 1/02
[52] U.S. Cl. .................. 179/18 FA; 324/117 R; 361/45; 179/1 MN
[58] Field of Search .................. 324/117 R, 127, 51; 321/6; 317/18 D; 340/253 B, 253 H, 253 N, 256; 179/18 FA, 18 FG; 361/44, 45

[56] References Cited
U.S. PATENT DOCUMENTS

| | | | |
|---|---|---|---|
| 2,153,378 | 4/1939 | Kramer | 324/117 R |
| 3,139,488 | 6/1964 | Wirth, Jr. | 179/18 FA |
| 3,175,042 | 3/1965 | Baldwin, Jr. et al. | 179/18 FA |
| 3,461,247 | 8/1969 | van Bosse | 179/18 FA |
| 3,473,091 | 10/1969 | Morris et al. | 317/18 D |

Primary Examiner—Rudolph V. Rolinec
Assistant Examiner—Ernest F. Karlsen
Attorney, Agent, or Firm—Christensen, O'Connor, Johnson & Kindness

[57] ABSTRACT

An electromagnetic sensing apparatus includes one or more magnetic cores coupled by windings to a pair of transmission line conductors for sensing the presence, and in some cases the magnitude and direction of loop currents flowing in the transmission line, without interfering with the transmission of signal information therealong. In one embodiment, the direction of loop current flow in the transmission line conductors is detected by applying a steady-state electromagnetic bias to the magnetic core to cause a polarity or direction determining asymmetrical response in a sense circuit that is electromagnetically coupled to the core by a sense winding. In another embodiment, a pair of separate magnetic cores are used, each having associated drive windings connected in series with the transmission line conductors, and associated sense windings. The various drive and sense windings are wound on the magnetic cores so as to cause detection of the direct loop current flowing in the transmission line conductors, and at the same time to cause self-cancellation of any electromagnetic coupled of the sensing signal to the drive windings which would otherwise appear as interference or noise on the transmission line.

2 Claims, 4 Drawing Figures

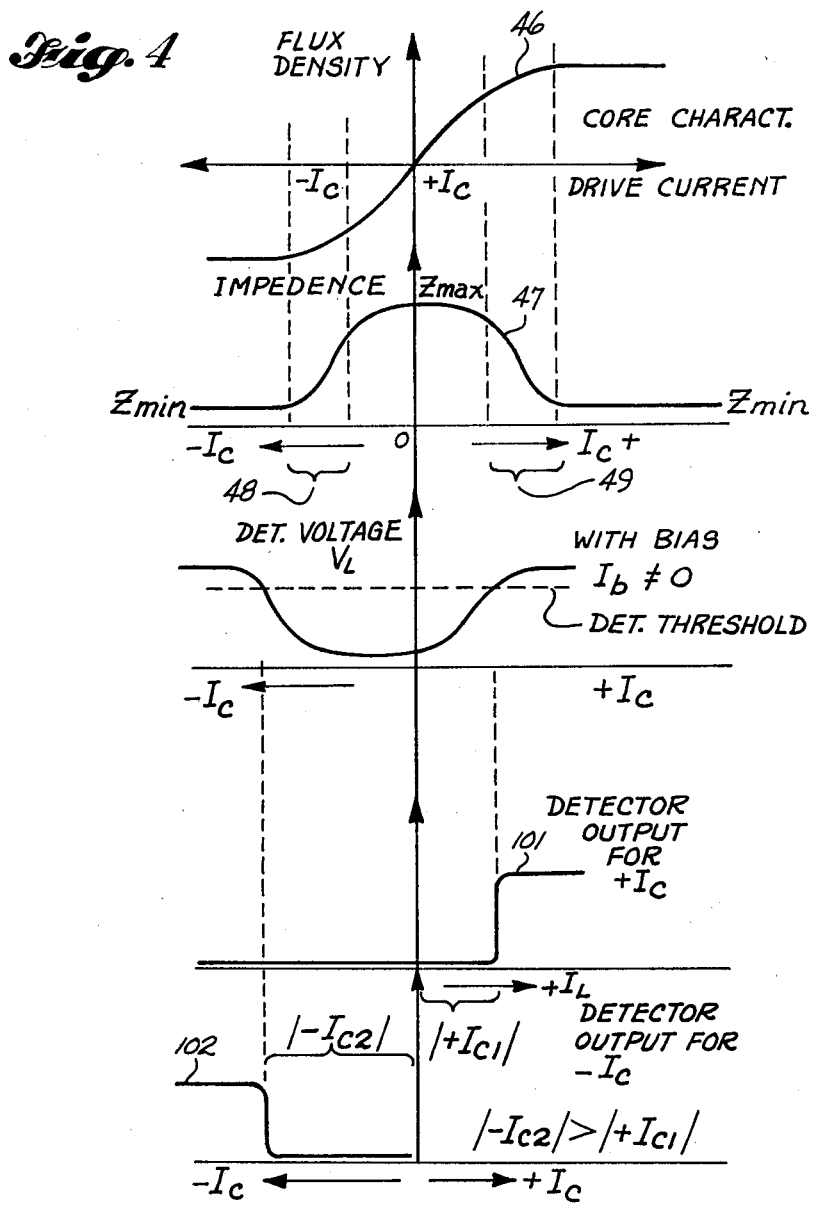

METHOD AND APPARATUS FOR DETECTING DIRECT CURRENTS IN A TRANSMISSION LINE

BACKGROUND OF THE INVENTION

The present invention in general relates to a method and apparatus for detecting direct currents flowing in the conductors of a transmission line.

In many telephone systems and information transmission systems in general, dc loop currents are generated in the conductors forming the transmission line to serve as a means for signaling or indicating a particular state of use or condition of the system. In telephone systems, these loop currents are sometimes referred to as supervisory signals in that the condition of the signal directs or commands certain responses from the overall system. As an example of such a direct current supervisory signal, some telephone systems employ a dc loop current to detect an "off-hook" condition at the subscriber's end of the transmission line.

The direct current signal is generated by a power source, sometimes symbolized as a battery, at the central office, or other plant, operated by the telephone company. An electro-mechanical switch, located on the subscriber's telephone instrument, is operated by removing the telephone handset from the instrument's cradle causing the "hook switch" to close at the subscriber's station. This permits the direct current to flow in a circuit loop including forward and return conductors provided by the transmission line, sometimes referred to as the "tip" and "ring" conductors, and with the "hook switch" completing the circuit at the subscriber's telephone.

Once a loop current begins to flow, a searching circuit or system at the central office recognizes the "off-hook" condition and transmits a dial tone to the subscriber and establishes a transmission path for use by the subscriber. Similarly, when the call has been completed and the subscriber has returned the hand set to the instrument's cradle, the "hook switch" is opened, terminating the dc loop current. This termination of the loop current may again be sensed by the central office equipment, signaling the fact that the call has been completed by the subscriber, and that the previously established transmission circuit is no longer being used.

Although the foregoing operation illustrates an important use of a supervisory loop current, it is but one application of the use of direct currents within an information signal transmission system. Other uses of the dc loop current include telephone systems in which the loop current is reversed in polarity, to signal a supervisory condition. For example, telephone office equipment based on a "called party answering" system uses a reversal of the direction of the loop current to indicate that the "called" party has answered a ringing signal.

Loop currents are employed as a means of signaling between central offices for controlling trunk lines, and within an office for various signal and control functions.

The loop current may also be employed as a means for detecting whether "loop extenders" and/or "battery boosters" are required in a particular transmission line. In this case, the magnitude of the dc loop current is monitored. If a particular transmission hook up requires an excessively long transmission line, it may be necessary to boost both the information signals and the supervisory signals in order to compensate for losses in the long line. In these cases, it is desirable to provide an accurate indication of the magnitude of the supervisory dc current at any given point in time.

Additionally, the loop current is sometimes used as a means for detecting faults, such as an open or shorted line, in the transmission network. An excessive current might indicate a line short. A lower than expected or zero current would indicate an "open" line.

Traditionally, loop currents have been monitored by using a line relay connected with its coil in series with the transmission line. Sensing relays used in this manner have the advantage of establishing complete electrical isolation between the transmission line itself, and the associated telephone control circuitry that is to be controlled in response to the contacts of the relay. In other words the coil of the relay is connected in the transmission line, however the contacts operated thereby are completely, electrically independent of the transmission line circuit. For this reason and others, sensing relays for detecting dc loop currents have been found satisfactory over the years for use in conventional telephone switching systems.

However, early telephone systems have undergone substantial modification and improvement in terms of efficiency and reliability. In these improved, modern systems, it is not desirable to use switching relays for all current sensing applications because of their relatively high operating power requirements, undesirably large dc resistance, slower operating speed and relatively large size.

in this regard, attempts have been made to find an improved means for use in transmission control systems for detecting loop currents. For example, electro-optic isolators connected in the loop current path of the telephone switching circuit have been proposed, however their use has not been found satisfactory for many applications, such as in transmission line pairs where it is necessary to discriminate between loop currents and common mode currents.

SUMMARY OF THE INVENTION AND ITS OBJECTIVES

Accordingly, it is an object of the present invention to provide a method and apparatus for detecting dc loop currents in transmission line networks which overcomes the above-noted disadvantages associated with line relays and other known sensing means, while still maintaining a high degree of electrical isolation between the transmission line and the control and switching circuitry.

Another object of the present invention is to provide such a method and apparatus for not only detecting the presence or absence of dc loop currents, but also for sensing and monitoring the relative magnitudes of such currents.

Briefly, one of the preferred embodiments of the invention includes a pair of balanced magnetic cores, each having a pair of drive windings associated therewith, wherein each such drive winding is connected in series with one of the conductors of the transmission line pair. In a telephone transmission system, the pair of conductors corresponds to the "tip" and "ring" conductors. These drive windings are arranged on the pair of magnetic cores so as to induce a common direction of magnetic flux (common as to each core) in response to a net loop current in the transmission line. In other words, with a dc loop current, the same current will be flowing in opposite longitudinal directions on the transmission line pair and the core windings are so arranged that the oppositely flowing current induces a magnetic flux in a common direction within each magnetic core so as to drive each core toward a condition of magnetic saturation. Additionally, each core is wound with a sense winding that is connected to circuit means for measuring changes in the electrical impedance of the sense windings as a function of the degree of core saturation. As the dc loop currents in the transmission line increase, there is a commensurate decrease in the impedance of the sense windings due to increasing core saturation, and this impedance change is detected by the circuit means. For this purpose, a sensing signal is generated by the circuit means and applied to the sense windings. To prevent electromagnetic coupling of the sensing signal into the drive windings and hence onto the transmission line, the various drive and sense windings are wound on the pair of cores and connected in circuit so as to cause self-cancellation of any coupling of the sensing signal into the various drive windings thereby preventing any coupling of the sensing signal into the transmission line.

BRIEF DESCRIPTION OF THE DRAWINGS

These and further objects and various advantages of the method and apparatus of the present invention will become apparent to those skilled in the art from a consideration of the following detailed description and appended drawings of particular, preferred embodiments thereof.

FIG. 4 is a multiple parameter graph illustrating the relationship between various magnetic and electrical conditions of the electro-magnetic circuits in accordance with the present invention.

DESCRIPTION OF PREFERRED EMBODIMENTS

Figure 1:
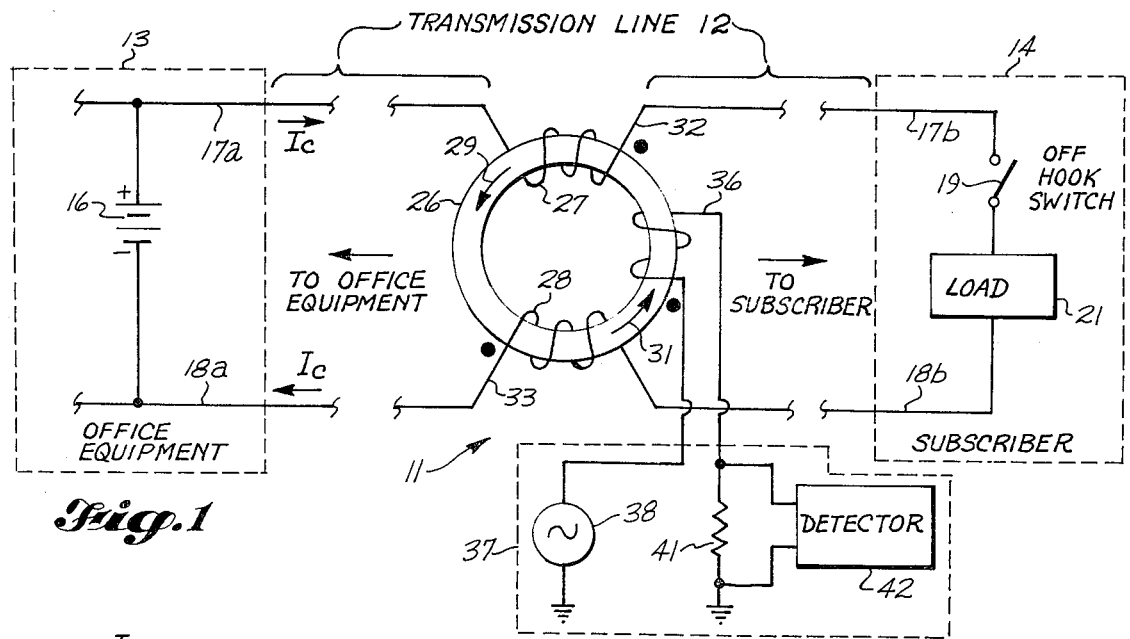
FIG. 1 is a schematic diagram showing the electromagnetic circuit according to one embodiment of the present invention for detecting dc loop currents flowing in a telephone transmission line system.

With reference to FIG. 1, the method and apparatus in accordance with the present invention is embodied by an electro-magnetic current sensing circuit 11 connected in series with a two-conductor transmission line 12 extending between the telephone office plant or equipment 13 and a subscriber 14. Although circuit 11 is used in this application to detect circulating dc loop currents in the transmission path of a telephone network, it will be appreciated that the invention may be utilized for detecting loop currents representing any predetermined control or signal function in communication or transmission systems in general.

In the telephone communications system of FIG. 1, a dc loop current is employed as a supervisory signal to signal office equipment 13 that an "off-hook" condition exists at the telephone of subscriber 14. This is achieved in existing telephone networks by connecting a battery or other direct current power source 16 across the "tip" and "ring" conductors 17a and 18a respectively, at the office equipment of two-conductor transmission line 12. In this instance, office equipment 13 also includes a standard double-wound line relay (not shown) for providing the usual coupling between the office equipment and the subscribers line 12. Thus, sensing circuit 11 may be, as here, employed in conjunction with a line relay.

From office equipment 13, line 12 extends over the pair of conductors to corresponding "tip" and "ring" conductors 17b and 18b respectively at the subscriber's telephone instrument. The instrument of subscriber 14 includes an electro-mechanical hook switch 19 which is actuated by the telephone receiver, such that the switch is opened when the receiver is placed in the cradle, and is closed when the receiver is removed for use by the subscriber. Additionally, the subscriber's instrument will include various circuitry for processing the voice communication signal or other signal information, and this circuitry is represented here by an electrical load 21 connected in series with conductors 17b and 18b.

As the receiver is lifted off the instrument by subscriber 14, switch 19 is closed causing a dc current $I_c$ to flow in a circuit loop formed in part by the pair of conductors of transmission line 12 and switch 19 and load 21 of the instrument at subscriber 14. Thus, current $I_c$ flows into "tip" conductor 17a and the associated conductor of transmission line 12 to conductor 17b and through switch 19 and load 21 of subscriber 14, and returns to office equipment 13 over "ring" conductor 18b and 18a and the associated conductor of transmission line 12.

As indicated above, one existing technique for detecting the presence of this loop current $I_c$, has been to employ a relay having its coil connected in series with the circuit. In most existing telephone equipment, a conventional telephone line relay is used for this purpose, having a double wound coil connected in the circuit at office equipment 13.

Because of the aforementioned shortcomings of such line relays for detecting and monitoring dc loop currents, electro-magnetic circuit 11 is used either as a replacement of the current detection function of the line relay or with the line relay as a supplemental means for detecting these currents.

Circuit 11 may be connected in series with the "tip" and "ring" conductors of transmission line 12 at any point between office equipment 13 and subscriber 14. For example, circuit 11 may be installed at the central office of the telephone network adjacent power source 16 for detecting the supervisory dc loop currents generated by closing "off-hook" switch 19 at subscriber 14. Alternatively the current detection circuit 11 may be installed downstream of the transmission line network, in a manner described in more detail herein, for detecting the necessity of loop extenders or battery boost auxiliaries.

Circuit 11 includes a magnetic core 26, here of annular configuration, and a pair of drive windings 27 and 28, magnetically coupled to core 26. Windings 27 and 28 are each individually connected in series with the conductors of transmission line 12, in this instance winding 27 being connected in series with the "tip" conductor 17a,b and winding 28 being connected in series with the "ring" conductor 18a,b as shown.

Moreover, drive windings 27 and 28 are arranged with respect to core 26 so as to generate a magnetic flux therein, in a common direction in response to circulating loop currents in which the currents are flowing in opposite directions in the pair of transmission line conductors. In other words, regardless of the direction of the circulating loop current, whether clockwise or counterclockwise as viewed in FIG. 1, the effect of the loop current in windings 27 and 28 is to produce a flux in the same direction of circulation within core 26. Thus, in the present example, dc loop current $I_c$ flowing through winding 27 will produce a magnetic flux in the direction indicated by arrow 29, while the same current $I_c$ flowing in the reverse direction through winding 28 produces another flux component in the direction indicated by arrow 31.

It will be observed that the generated flux components are circulating in the same direction within core 26, such that the net flux generated within the core is the sum of the two components. If the sense of one of windings 27 and 28 were reversed, the flux components would be in opposition to each other, and would cancel, leaving a net flux of zero within core 26. For this embodiment of the invention, it is essential that the flux components aid one another so that core 26 is driven by the dc loop current $I_c$ toward a condition of saturation. The proper sense of windings 27 and 28 with respect to the conductors of transmission line 12 is indicated by the dot convention in FIG. 1 wherein the dotted leads 32 and 33 of windings 27 and 28 respectively are connected so that one of the leads lies adjacent the subscriber 14 while the other lead lies adjacent office equipment 13.

By arranging windings 27 and 28 in this manner, the dc loop current $I_c$ flowing in the transmission system can be used as a control signal for changing the state of magnetic saturation of core 26 as a function of the current magnitude. By appropriate selection of the magnetic characteristics of core 26 and the number of turns provided on drive windings 27 and 28, a given dc loop current, $I_c$, can be sufficient to cause core 26 to change from an unsaturated, highly permeable state, to a substantially saturated, low permeability state for a given increase in loop current magnitude. For loop currents of magnitude in between these extremes, core 26 may exhibit a continuously variable saturation and associated variable permeability, varying as a function of the current level.

In order to sense these various loop current conditions in the telephone system of FIG. 1, a sense winding 36 is magnetically coupled to core 26 as illustrated, and electrically connected to a sensing circuit 37. Winding 36 together with circuit 37 serve as a means for detecting the extent of saturation of core 26 as a function of the presence and mangitude of dc loop current $I_c$.

Figure 2:
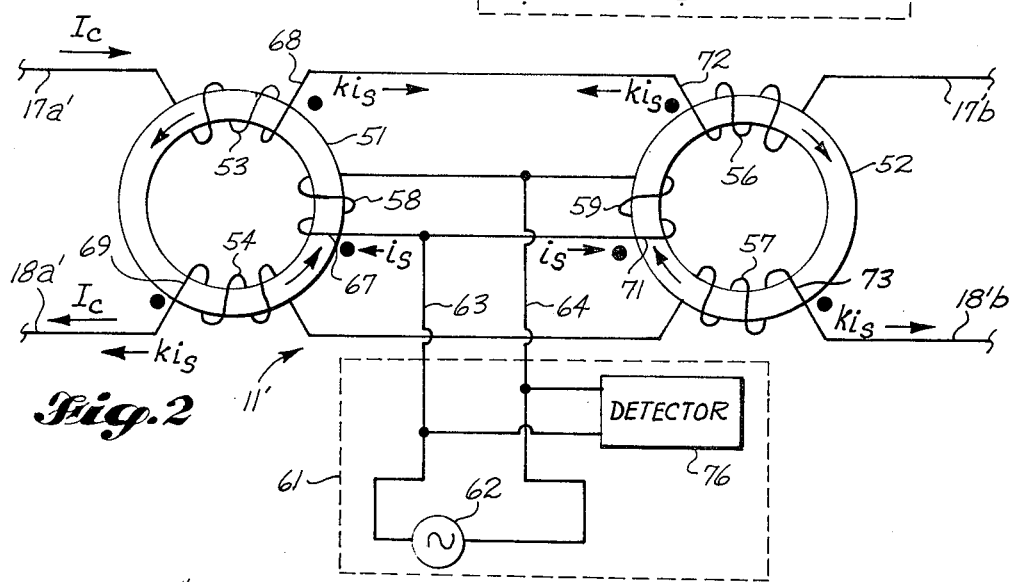
FIG. 2 is an alternative preferred embodiment of the electro-magnetic circuit for use in a telephone system or other transmission system similar to that shown in FIG. 1.

In the embodiment of FIG. 1, the degree of saturation of core 26 is monitored by an intermediate step of measuring the ac impedance of sense winding 36 with the use of circuit 37. Circuit 37 includes in this embodiment an ac oscillator or signal source 38 for applying an ac signal across winding 36 and a load resistance 41. The ac signal develops a voltage drop across winding 36, wherein the winding acts like an inductor having an impedance varying as a function of the core permeability, or in other words as a function of the degree of saturation of core 26. A change in the voltage drop across winding 36 as a function of core saturation, and thus as a function of loop current $I_c$, causes a proportional change in the voltage across load resistor 41. In order to detect this change in impedance of sense winding 36, circuit 37 further includes a voltage detector 42 which is responsive to changes in the voltage drop across resistor 41. Alternatively, and as shown in the embodiment of FIG. 2, the change in core permeability may be detected by connecting a detector 76 directly across the sense winding 36.

As an example of this operation, assume that switch 19 is open, representing an "on-hook" condition at subscriber 14. Accordingly, the loop current $I_c$ is zero and core 26 remains in a nonsaturated, high permeability state.

When switch 19 is closed and a current $I_c$ of predetermined magnitude commences flowing in the circuit loop, windings 27 and 28 generate a combined magnetic flux which drives the magnetic condition of core 26 from a linear operating range toward a nonlinear saturating state. So long as core 26 remains in a linear magnetic range, changes in the loop current $I_c$ do not result in any change in the impedance of winding 26. If on the other hand, the flux is sufficient to cause some saturation of core 26, then the impedance of winding 36 undergoes a measurable change which may be detected by detector 42.

For example detector 42 may provide a threshold detection of a particular threshold voltage drop across resistor 41. When the impedance of winding 36 becomes sufficiently low to cause a commensurate increase in voltage across load resistor 41, equal to the threshold of detector 42, then detector 42 responsively signals this occurrence. By correlating the threshold of responsiveness of detector 42 to a particular magnitude of loop current $I_c$, detector 42 can signal the presence or absence of a discrete change in dc loop current representing an "off-hook" condition at subscriber 14.

This operation is graphically illustrated in FIG. 4 by a core characteristic curve 46 and an associated impedance curve 47 both plotted as a function of loop or drive current flowing within windings 27 and 28. A plus (+) drive current corresponds to a direction of current flow as indicated by the arrows of FIG. 1 with the loop current flowing away from office eqipment 13 on "tip" line 17a and returning to the office equipment over "ring" line 18a. The negative (−) represents a condition in which the loop current is flowing in a reverse direction from that shown in FIG. 1.

As indicated in FIG. 4, for small loop currents centered around $I_c = 0$, the flux density curve 46 has a generally linear slope, representing a linear operating range of the core. As the currents become more excessive either in a positive or negative direction, the core begins to saturate as indicated by the continuously decreasing slope of the curve. In the transition regions indicated by reference numerals 48 and 49, i.e., between the central linear core range and the extreme, substantially saturated ranges of the core, the impedance associated with sense winding 36 undergoes a substantial change as indicated by curve 47. For example, with increasing loop current + $I_c$ the impedance drops from a Z max. to a Z min. in the transistion region 49. Similarly, in the negative direction, an increasing −$I_c$ causes sense winding 36 to drop an impedance from Z max. to Z min. as shown by curve 47 in region 48.

Circuit 37, including resistor 41, and detector 42 are selected to sense this impedance change in winding 36, which in turn senses the condition or state of loop current flowing in the transmission line circuit.

In the particular embodiment shown in FIG. 1, the following design parameters have been found satisfactory for achieving reliable detection of the "off-hook" loop current. A relatively small, annular magnetic member may be used for core 26, and more specifically a toroidal core having an outside diameter 0.2 inches has been found satisfactory. Although the saturation characteristics of the magnetic core varies depending upon the material from which it is made, a suitable toroidal shaped core of the foregoing general dimensions may be selected from manufacturer's specifications such that with a reasonable number of turns in windings 27 and 28, the core will exhibit conditions of saturation as exemplified by curve 46 of FIG. 4. For example, in the present application, the 0.2 inch toroidal core with drive windings 27 and 28 having with approximately 12 turns each, a current in the range of 5-150 miliamps may be sufficient to drive the core into the saturation transistion regions 48 and 49 as shown in FIG. 4. This range of current magnitudes is typical of the dc supervisory signals used in telephone communications systems.

The frequency of the alternating signal developed by source 38 is not critical. In this embodiment, a frequency of 100 KHz may be used, so as to place the frequency above the maximum expected frequency of the information signals carried by transmission line 12. This will minimize any interference between sensing circuit 37 and the information transmitted on line 12. Also by using a frequency which is substantially higher than the maximum information signal frequency, core 26 together with windings 27, 28 and 36 may be designed for maximum sensitivity to the higher frequency sense signal, and at the same time present minimum impedance to the lower frequency information signal content on the transmission line.

Even the foregoing general frequency range of the sensing circuit is not an absolute requirement. It is possible to use a sense signal frequency lying within the information frequency band of the communications system, e.g. the voice frequency band of a telephone system. In such case, appropriate filtering can be provided in the transmission lines for minimizing contamination of the information signal by the sense signal.

In the foregoing discussion, sense circuit 37 is used for detecting different, discrete levels of dc loop current within the telephone transmission system. As a more general application, sense circuit 37 may be utilized not only to detect the presence or absence of such loop currents but also to detect or sense the relative magnitude of such currents.

For this purpose, detector 42 may be a device, such as a meter or other instrument for registering the voltage drop across resistor 41. By correlating the magnitude of voltage drop across resistor 41 to the magnitude of the average or net dc loop current flowing in windings 27 and 28, the relative or even absolute magnitude of loop current $I_c$ can be monitored. Such a monitoring of the current level is useful, for example, in detecting whether or not loop extenders or battery boost facilities are required. In situations where a particular telephone transmission path is established over an exceedingly long transmission line, the strength of the voice or information signal and the supervisory signals may be reduced to undesirably low levels. In such case, telephone systems provide for the addition of loop extenders which boost the amplitude of the information signal to compensate for transmission line losses. Similarly, battery boost circuits are provided for increasing the undesirably low dc loop currents back to proper levels.

Thus, the voltage measuring provisions of detector 42 may be used as an automatic electrical control signal for inserting a loop extender and/or a battery booster into the transmission line circuit.

Furthermore, detector 42 may be a multi-step detector, capable of detecting two or more discrete levels or magnitudes of dc loop current. Detector 42 may be designed in a manner obvious to those persons skilled in the art for detecting the multi-step currents as a function of multi-step voltages across load resistor 41. For example, separate threshold detectors having their inputs connected in parallel, and each responding to a different threshold voltage magnitude, may be employed for such multi-step detection.

It will be appreciated that circuit 11 serves to automatically and effectively discriminate between longitudinal line currents, i.e., common mode currents flowing in the same direction on both conductors of transmission line 12, and true, dc loop currents in which the same current flows in opposite directions on the line conductors. If a common mode condition occurs in which currents of substantially equal magnitude flow simultaneously in the same direction on conductor 17a,b and 18a,b either toward subscriber 14 or toward office equipment 13, there will be no significant, net magnetic flux induced in core 26.

Because of the sense in which windings 27 and 28 are wound on core 26, these longitudinal currents induce flux components in the core which are in opposite directions and which thus cancel each other. Since little if any net flux is generated within the core under these conditions, it remains unchanged and there is no appreciable change in the impedance on winding 36 and thus no voltage change is sensed by detector 42.

Furthermore, it will be observed that circuit 11 is completely, isolated from any direct current electrical connection with transmission line 12. In other words, the sense circuit 37 and the associated sense winding 36 are dc isolated from the pair of conductors forming transmission line 12, and thus there is no chance of any direct current interference between these circuits. The only coupling between the circuits is the electro-magnetic coupling between the windings on core 26 and this only to the extent that alternating current signals are capable of being transferred from sense winding 36 to drive windings 27 and 28. This ac coupling can be minimized by selecting the sense signal at a frequency outside the frequency band of the voice or other information content being transmitted by line 12 or by appropriate filtering as discussed above.

Furthermore, windings 27 and 28 offer little if any significant impedance to the transmission of signals on line 12. The few number of turns used in forming windings 27 and 28 introduce substantially no significant dc resistance to the conductors of transmission line 12 and insert an inductive impedance equivalent to only a few longitudinal feet of transmission line 12. In other words neither the dc resistance nor the ac inductive impedance added by windings 27 and 28 on core 26 significantly attentuate the transmitted signals.

It will be observed that detector 42 may be embodied by any one of several suitable types of detectors. For example a peak detector responsive to the alternating current voltage developed across resistor 41 may be used to provide an output responsive to the dc loop current $I_c$. Alternatively, the varying amplitude ac signal from winding 36 may be processed through an ac to dc converter for producing a variable magnitude dc signal proportional to the magnitude of loop current $I_c$. In either case, the detector 42 may be arranged as shown to monitor the voltage across a load resistance 41, or alternatively, connected directly across the terminals of winding 36 to measure or monitor directly, the voltage and impedance thereacross.

Detector 42 may be provided with suitable means, well known to those skilled in the art, for insuring reliable detection of only those signals appearing on load resistor 41 caused by a change in impedance of winding 36 due to a condition of dc loop current $I_c$. In other words detector 42 must discriminate between voltage changes across resistor 41 due to changes in the loop current $I_c$ and voltage or current transients due to information or other supervisory signals on transmission line 12 and coupled to sense winding 36 by drive windings 27 and 28. This result may be achieved in a number of ways, such as by including frequency filtering in detector 42 selectively responsive to the frequency of source 38 and/or the provision of delay or integration circuitry in detector 42 for discriminating against transient fluctuations in the voltage across resistor 41 coupled to winding 36 from transmission line 12 and windings 27 and 28.

FIG. 2 illustrates an alternative embodiment of the method and apparatus of the present invention in which an electro-magnetic circuit 11' includes first and second magnetic cores 51 and 52, each having associated drive windings 53, 54 and 56, 57 connected in series with a pair of conductors of a transmission line. For example, the pair of conductors may be the "tip" and "ring" conductors 17'a,b and 18'a,b of a telephone transmission line as in the case of the embodiment of FIG. 1.

The pair of magnetic cores 51 and 52 provides an additional magnetic circuit for cancelling out any signal content produced by the sensing circuit, and otherwise applied to the transmission line by reason of magnetic coupling between the sense windings and drive windings.

More particularly, control windings 53, 54, and 56, 57 of the respective magnetic cores 51 and 52 are connected so as to be in serial phase opposition with respect to any sense signal coupled thereto by driving sense windings 58 and 59 with an oscillator or other ac sensing source 62 of sensing circuit 61. In this particular instance, sense windings 58 and 59 are driven in parallel over lines 63 and 64 from source 62. As indicated by the dot convention shown adjacent the various drive and sense windings, the output signal from drive winding 53 in response to sense winding 58 is in phase opposition to the output of drive winding 56 in response to sense winding 59. Similarly drive windings 54 and 57 are in phase opposition in response to signals applied to the respective sense windings 58 and 59 from source 62.

In this embodiment, the self-cancelling of the coupling sense signal occurs in the following manner. Assume that sense windings 58 and 59, at dotted leads 67 and 71, respectively thereof, are simultaneously driven by source 62 such that a sense current $ki_s$ simultaneously flows into these leads as indicated. For core 51, this results in a proportional sense current $ki_s$ flowing out of the dotted leads 68 and 69 of drive windings 53 and 54 respectively; while for core 52, the same proportional sense current $ki_s$ flows out of dotted leads 72 and 73 of drive windings 56 and 57.

Since windings 53 and 56 of the respective cores are connected in phase opposition relative to the sense drive signal, the components of $ki_s$ flowing out of dotted terminal 68 and 72 cancel one another. Similarly, the currents $ki_s$ flowing out of dotted terminal 69 and 73 of serially opposed windings 54 and 57, being in opposite directions, also cancel. The net result is a complete self-cancellation of all the sense signal components coupled to the various drive windings of the magnetic cores. The sense signal does not appear on either the office equipment side of "tip" and "ring" conductors 17'a or 18'a or on the subscriber's side of the line at conductors 17'b and 18'b.

Additionally, variable signals such as impulses, noise, etc. that appear on the tip and ring lines 17'a, b and 18'a, b are isolated from the detector 76 by self-cancellation in the oppositely wound core windings, thus permitting the detector to function free from such external signal disturbances.

As indicated above in connection with the embodiment of FIG. 1, the detection of impedance variations in the sense winding as a function of the dc loop current may be achieved by a direct detection across the leads of the windings. This arrangement is illustrated in circuit 11' of FIG. 2 by a detector 76 connected across windings 58 and 59 over lines 63 and 64. Changes in the voltage drop across the parallel connected sense windings 58 and 59 are directly monitored by the detector. It will be observed that the arrangement of the various windings on cores 51 and 52 to cause self-cancellation of the coupled sense signal in the drive windings, does not influence or affect the dc current sensing function of circuit 61 and windings 58 and 59. Both magnetic cores 51 and 52 are driven toward or into saturation by the dc loop current $I_c$ by arranging the drive windings on each core so as to produce a common direction of flux within the core body. Because the inductive impedance of sense windings 58 and 59 is only a function of the degree of core saturation, not a function of the particular phase of coupling between the sense and drive windings, circuit 61 and detector 76 function to monitor the dc loop current $I_c$ in the same manner as described above for circuit 11 in FIG. 1.

It will be noted that the sensing function of the electro-magnetic circuits of FIGS. 1 and 2 operates independently of the particular direction or polarity of loop current $I_c$. In other words, the dc loop current flowing in the transmission line may be reversed, and the magnetic core or cores of the circuit will still be driven toward a condition of saturation, causing a change in the impedance characteristics of the sense winding or windings. It is contemplated however, that the method and apparatus of the present invention may be arranged in a configuration which renders it sensitive or responsive to the particular polarity of the loop current.

Figure 3:
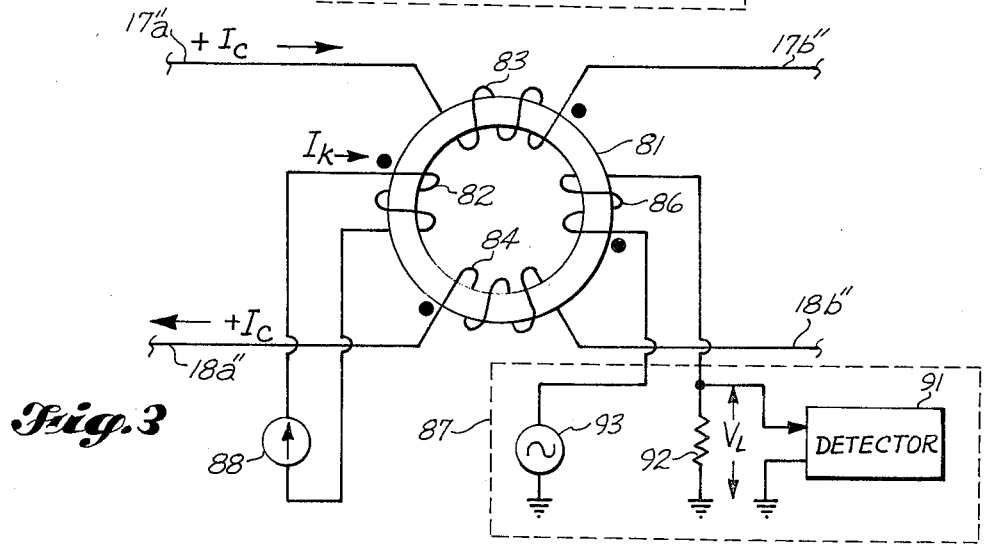
FIG. 3 is a further alternative preferred embodiment of the electro-magnetic circuit in accordance with the present invention.

FIG. 3 shows an electro-magnetic sensing circuit 11' which is capable of detecting changes in the direction of circulation, i.e., polarity of loop current $I_c$. More particularly, circuit 11' is provided with an electro-magnetic biasing means for establishing a magnetic flux bias on the sensing core 81. This results in an asymmetrical response of the sense winding impedance as a function of the polarity of the circulating dc loop current $I_c$.

For this purpose and in accordance with this particular embodiment, a biasing winding 82 is provided on core 81 in addition to the pair of drive windings 83 and 84 and the sense winding 86. In the absence of any bias current or voltage applied to biasing winding 82, sense winding 86 and sense circuit 87 function in a manner similar to the operation described for circuit 11 for FIG. 1, to detect the presence, absence and/or magnitude of the dc loop current flowing in the transmission line conductors. In this case, it is again noted that if the current $I_c$ is reversed in its direction of circulation while maintaining the same magnitude, sense winding 86 and sense circuit 87 are unable to distinguish between the two opposite current polarities because of the symmetrical saturation characteristics of the magnetic core 81 as shown by curves 46 and 47 of FIG. 4.

By applying a biasing current $I_b$ from current source 88 to biasing winding 82, a magnetic bias is established on core 81 which shifts its otherwise symmetrical saturation response to one side or the other of the vertical axis as visualized from curve 46 of FIG. 4. In other words, the biasing flux places core 81 closer to a fully saturated condition with respect to the receptiveness of additional flux in the same magnetic direction, and places the core further away from a saturated condition with respect to fluxes induced in an opposite sense from the bias flux. In the present embodiment, this results in an asymmetrical response to the magnitude and polarity of loop current $I_c$, which in turn enables circuit 11″ to detect the direction of the loop current.

This operation is best illustrated by reference to FIG. 4, wherein a curve 89 shows the voltage $V_1$ detected by detector 91 across load resistor 92 of sense circuit 87 as a function of the polarity and magnitude of loop current $I_c$. The detected voltage $V_1$ is developed as a function of the impedance of sense winding 86 by connecting an alternating current signal source 93 thereto and detecting the voltage changes across the load resistor 92 as a function of the sense winding impedance as in the case of the embodiment of FIG. 1.

For relatively unsaturated, linear conditions of core 81, the inductive impedance of sense winding 86 is relatively high and the voltage $V_1$ developed across load resistor 92 is relatively low. For increasing core saturation, $V_1$ rises in magnitude accordingly.

The curve 89 of FIG. 4 representing the magnitude of detected voltage $V_1$ as a function of the loop current, is asymmetrically positioned with respect to the vertical axis corresponding to $I_c = 0$ because of the electro-magnetic bias established on biasing winding 82. In this instance current $I_b$ places the core closer to saturation for $+I_c$ currents circulating in a clockwise current loop as visualized in FIG. 3. In other words a lower magnitude of loop current $I_c$ is required for positive, clockwise flowing loop currents, than for negative, counterclockwise flowing loop currents. This is confirmed by the characteristics of curve 89 showing an increase in voltage $V_1$ across load resistor 92 for lower magnitude values of $+I_c$, whereas relatively larger magnitudes of $-I_c$ loop currents are required for producing the same voltage output $V_1$ in the opposite current direction.

Accordingly, for a telephone system or other communications system in which a reversal of the loop current is used as a supervisory signal, detector 91 is capable of identifying and signaling the occurrence of a current reversal on transmission lines 17″a,b and 18″a,b.

This is seen in FIG. 4 by comparing the detector output curve 101 for positive, clockwise circulating loop currents ($+I_c$) with the detector output curves 102 for counterclockwise, negative loop currents ($-I_c$). In a telephone system, the absolute magnitude of the loop current $I_c$, that is the current level irrespective of its polarity, is usually known and held within established tolerances. Accordingly, detector 91 may in this exemplary embodiment, be adjusted to respond to a threshold voltage across resistor 92 corresponding to an absolute current level greater than $I_{c1}$ and less than $I_{c2}$, as these currents are illustrated in the graph of FIG. 4.

As an example of an application of circuit 11″, some telephone systems use a current reversal of $I_c$ for signaling the fact that a called party has answered. If, a negative, counterclockwise flow of loop current ($-I_c$) represents the state of the telephone lines prior to the called party answering, and a positive, clockwise direction of loop current ($+I_c$) represents the changed or reversed current direction when the called party answers, then detector 91 may operate as follows. Negative loop currents produce a core flux in opposition to the bias flux from $I_b$ and thus the negative loop current must exceed $-I_{c2}$ before the net change in core permeability causes a response in detector 91. On the other hand, when the current direction is reversed, producing a positive, clockwise current flow ($+I_c$) then the bias flux and loop current flux are additive and the detector senses this occurrence by responding to a lower threshold current $I_{c1}$. Thus, by selecting the magnitude which produces a voltage output of the reversible loop current $I_c$ to lie between the absolute magnitudes of $|+I_{c1}|$ and $|-I_{c2}|$, the detector 91 will respond to only one direction of loop current, which direction may be selected to indicate that the called party has answered.

It will be appreciated that circuit 11″ of FIG. 3 is but one particular and preferred embodiment for detecting the polarity of the circulating loop currents. Alternatively, the electro-magnetic bias established in this instance by separate bias winding 82, may be combined with sense winding 86, by generating a constant dc bias current in the sense winding circuit. Another alternative to this embodiment is to provide a switching circuit in conjunction with bias winding 82 for gating the bias "on and off", or for permitting reversal of the direction of the magnetic bias, and correlating this "on-off" bias or bias reversal control with the detected output from detector 91. The presence and/or direction of the bias may thus be correlated with the direction or polarity of the loop current, to provide for sensing the polarity or direction of the loop current, when the absolute magnitudes thereof are unknown.

Still further embodiments of the invention will be recognized by those skilled in the art. As another example, the sense winding on the magnetic core may itself be employed as an inductive impedance in an oscillator circuit. In such case, the frequency and operation of the oscillator will change as a function of the sense winding impedance, which in turn varies as a function of the dc loop current.

Thus while only a limited number of embodiments of the present invention have been disclosed herein, it will be readily apparent to persons skilled in the art that numerous changes and modifications may be made thereto within departing from the spirit of the invention. Accordingly, the foregoing disclosure description thereof are for illustrative purposes only and do not in any way limit the invention which is defined only by the following claims.

What is claimed is:

1. An apparatus for detecting dc loop current flow, while rejecting longitudinal current flow, in a pair of conductors of a telephone transmission line which transmits voice signals between a central office and a subscriber's station, comprising:

first and second, substantially identical, magnetic cores, and first and second pairs of drive windings, one winding of each of said first and second pairs of drive windings being connected in series with a separate one of said conductors of said telephone transmission line and said first and second pairs of windings being so associated with said first and second cores, respectively, so that longitudinal current flow in said conductors induces mutually opposed, self-cancelling flux components in each of said first and second cores, and so that dc current flow in said conductors induces additive flux components in each of said first and second cores that drive each of said cores toward magnetic saturation;

first and second sense windings associated with said first and second cores, respectively;

sensing circuit means connected to said first and second sense windings, said sensing circuit means including an ac signal source means for applying an ac sensing signal to said first and second sense windings, and an electrical detector means connected to said first and second sense windings for detecting variations in the impedance of said first and second sense windings to said ac sensing signal as a function of variation in the saturation of said first and second cores; and said first and second sense windings being so associated with said first and second magnetic cores, respectively, so that electromagnetic coupling between said first sense winding and said first pair of drive windings on said first core is in phase opposition to electromagnetic coupling between said second sense winding and said second pair of drive windings on said second core, whereby ac signals that are electromagnetically coupled between said first sense winding and said first pair of drive windings are electrically cancelled by equal and opposite phase signals which are electromagnetically coupled between said second sense winding and said second pair of drive windings.

2. The apparatus recited in claim 1, wherein each of said first and second magnetic cores is of a toroidal configuration and said first and second pairs of drive windings are wound on said first and second cores, respectively, so that dc loop current flow in said conductors of said telephone transmission line induce magnetic flux components which, within each core, circle and toroidal configuration thereof in the same direction, and so that longitudinal current flow in said conductors induces flux components which, within each core, circle the toroidal configuration in opposite directions.

* * * * *